United States Patent
Escalier et al.

(10) Patent No.: US 12,529,911 B2
(45) Date of Patent: Jan. 20, 2026

(54) METHOD FOR DETERMINING AN ORIENTED 3D REPRESENTATION OF THE HEAD OF A PERSON IN A NATURAL VISUAL POSTURE

(71) Applicant: Essilor International, Charenton-le-Pont (FR)

(72) Inventors: Guilhem Escalier, Charenton-le-Pont (FR); Paul Joret, Charenton-le-Pont (FR); Thierry Bonnin, Charenton-le-Pont (FR); Amandine Debieuvre, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 679 days.

(21) Appl. No.: 17/607,176

(22) PCT Filed: Apr. 27, 2020

(86) PCT No.: PCT/EP2020/061646
§ 371 (c)(1),
(2) Date: Oct. 28, 2021

(87) PCT Pub. No.: WO2020/221701
PCT Pub. Date: Nov. 5, 2020

(65) Prior Publication Data
US 2022/0229312 A1    Jul. 21, 2022

(30) Foreign Application Priority Data

Apr. 30, 2019  (EP) .................................. 19305549

(51) Int. Cl.
*G02C 7/02*     (2006.01)
*A61B 3/113*    (2006.01)
(Continued)

(52) U.S. Cl.
CPC .............. *G02C 7/027* (2013.01); *A61B 3/113* (2013.01); *A61B 3/14* (2013.01); *G02C 13/005* (2013.01)

(58) Field of Classification Search
CPC ......... A61B 3/113; A61B 3/14; A61B 5/0064; A61B 5/0077; A61B 5/1116;
(Continued)

(56) References Cited

U.S. PATENT DOCUMENTS

2007/0229761 A1  10/2007  Gimenez Carol et al.
2017/0115513 A1  4/2017   Baranton et al.

OTHER PUBLICATIONS

International Search Report and Written Opinion issued on Jul. 8, 2020 in PCT/EP2020/061646 filed on Apr. 27, 2020.

*Primary Examiner* — Jack Dinh
(74) *Attorney, Agent, or Firm* — Oblon, McClelland, Maier & Neustadt, L.L.P.

(57) ABSTRACT

A method for implemented by computer means for determining an oriented 3D representation of the head of a person in a natural visual posture, including receiving a first dataset corresponding to a first 3D representation of the head of the person in a first frame and the position of the rotation center of at least one eye of the person in said first frame, determining a second dataset corresponding to the orientation of the head of the person in a natural visual posture in a second frame, and determining an oriented 3D representation of the head of the person by orienting the first 3D representation of the head of the person based on the orientation of the head of the person in a common frame.

14 Claims, 1 Drawing Sheet

(51) Int. Cl.
*A61B 3/14* (2006.01)
*G02C 13/00* (2006.01)

(58) Field of Classification Search
CPC . A61B 5/1121; A61B 5/1128; A61B 2576/02; G02C 7/027; G02C 13/005
See application file for complete search history.

METHOD FOR DETERMINING AN ORIENTED 3D REPRESENTATION OF THE HEAD OF A PERSON IN A NATURAL VISUAL POSTURE

FIELD OF THE INVENTION

The invention relates to a method for determining an oriented 3D representation of the head of a person in a natural visual posture. The invention further relates to a method of determining fitting parameter of a pair of spectacle lenses adapted for a person using the oriented 3D representation of the head of the person obtain by a method according to the invention.

BACKGROUND OF THE INVENTION

The design and manufacture of an ophthalmic lens suitable for a wearer and for a chosen spectacle frame presently requires one or more measurements to be taken at an opticians.

Methods allowing the ophthalmic lenses of a piece of optical equipment intended for an individual to be personalized depending on parameters associated with the individual and the spectacle frame chosen are for example based on the determination of the position of the rotation center of each eye of the individual with respect to the frame positioned on his head.

It is then possible to precisely determine the position of the optical center of each ophthalmic lens in the chosen frame so that the ophthalmic lens is correctly positioned in front of the eyes of the individual.

Here, the position of the rotation center of the eye is determined with respect to the ophthalmic lens, statically, under conditions that are very different from the natural conditions under which the frame is worn, without taking into account the posture of the individual.

Known methods do not allow, for example, the position of the rotation center of the eye of the individual to be determined with respect to the posture of the body of the individual, under conditions similar to those encountered in the day-to-day life of the individual and possibly during a movement of this individual.

Specifically, existing methods and devices that allow the posture of the body to be determined with respect to the image-capturing device are not precise enough to allow the position of the rotation centers of the eyes to be determined with respect to the body.

Consequently, measurements carried out at an opticians are therefore imprecise because of the unnatural conditions under which the measurements are taken.

In order to remedy the aforementioned drawbacks of the prior art, the present invention proposes a method for determining an oriented 3D representation of the head of a person allowing the posture of the body of the individual to be taken into account.

SUMMARY OF THE INVENTION

To this end, the invention proposes a method for implemented by computer means for determining an oriented 3D representation of the head of a person in a natural visual posture, the method comprising the following steps:
a) receiving a first dataset corresponding to a first 3D representation of the head of the person in a first frame and the position of the rotation center of at least one eye of the person in said first frame,
b) determining a second dataset corresponding to the orientation of the head of the person in a natural visual posture in a second frame,
c) determining an oriented 3D representation of the head of the person by orienting the first 3D representation of the head of the person based on the orientation of the head of the person of step b) in a common frame.

Advantageously, such method allows separating morphological measurements and posture in order to determine an oriented 3D head scan in defined posture with position of the rotation center of at least one eye of the person.

Thanks to the invention, morphological measurement can be done with a precise instrumentation without taking into account the posture allowing the determination of the position of the rotation center of at least one eye of the person in a three-dimensional head scan that will be used as a metrological frame for next steps.

Then, posture is done in a second time in an "unconstrained" situation and lead by an eye care practitioner (ECP).

The common frame is the association of step a) and b) by oriented the morphological measurement thanks to the posture measurement. This common frame is an oriented 3D head scan in defined posture which can be used and reused to fit real or virtual frames in order to design an ophthalmologic lens for a spectacle frame.

According to further embodiments which can be considered alone or in combination:
- during step b), the direction of the gaze of the person is determined;
- the origin of the common frame is based on said rotation center of said at least one eye of the person;
- in step b), the person is placed in a real-life situation in which the posture of the head of the person is unconstrained;
- in the step b), the person carries out one or more habitual activities;
- the habitual activity of the person is one of the following activities:
  - reading from various media (book, magazine, smart phone, laptop, desktop computer)
  - using a smart phone or a tablet (watching videos, looking at pictures, taking photography)
  - working at a desk,
  - driving,
  - practicing a sport,
  - cooking,
  - playing on a games console,
  - resting seated,
  - watching the television,
  - playing a musical instrument;
- in step b), the position of the rotation center of the eye of the person is determined from one or more acquisitions of images of the head of the person;
- to determine the direction of the gaze of the person, the image of the pupil of the person or the corneal reflection is identified in the image captured in step b), and the sought direction of the gaze is deduced therefrom depending on the position of the rotation center in the second frame of reference, said position being determined in the first set of data in the first frame of reference;
- to determine the direction of the gaze of the person, the position in the second frame of reference of elements targeted by the gaze and belonging to the environment of the person is determined;

in step b), the second set of data comprises a series of second images of the head of the person being acquired while the person is fixating his gaze on a visual target, the position of this visual target with respect to a second image-capturing device is determined during the capture of each second image;

the method further comprises prior to step b) a step of calibrating during which a calibration of a second device for capturing two-dimensional or three-dimensional images is carried out, in which step an image of a dedicated standard object is captured with said second image-capturing device;

the position and/or orientation in space of said second image-capturing device is determined during step b), and information relating to the position and/or orientation of the head of the person in space in a natural visual posture is determined therefrom;

the first dataset comprises the position of the rotation center of both eyes of the person in the first frame and the origin of the common frame corresponds to the cyclopean eye of the person;

the first dataset is acquired by virtue of a first device for capturing three-dimensional images, this three-dimensional image then constituting said first representation of the head of the person;

upon acquiring the first dataset the position of the rotation center in the first frame of reference is determined by the following steps:
at least two images of the head of the person are captured using an image-capturing device, in which images of the postures of the head of the person with respect to said image-capturing device are different and in which images the person is fixating his gaze on a sighting point of predetermined position,
the gaze directions of the person corresponding to each of the two images are determined,
the position of the rotation center of at least one eye of the person is deduced therefrom;

the step b) and the step of acquiring the first dataset are carried out separately and using different image-capturing devices;

in a step prior to step c), each of the first and second dataset are stored in correspondence with an identifier of the person.

Another object of the invention is a method of determining fitting parameter of a pair of spectacle lenses adapted for a person using the oriented 3D representation of the head of the person obtain by a method according to the invention.

The invention also relates to a system for the execution of a method for determining an oriented 3D representation of the head of a person in a natural visual posture according to the invention and as previously described. More particularly, the system comprises:
a memory; and
a processor arranged to execute a program instructions stored in the memory to at least:
a) receiving a first dataset corresponding to a first 3D representation of the head of the person in a first frame and the position of the rotation center of at least one eye of the person in said first frame,
b) determining a second dataset corresponding to the orientation of the head of the person in a natural visual posture in a second frame,
c) determining an oriented 3D representation of the head of the person by orienting the first 3D representation of the head of the person based on the orientation of the head of the person of step b) in a common frame.

The invention further relates to a computer program product comprising one or more stored sequence of instruction that is accessible to a processor and which, when executed by the processor, causes the processor to carry out the steps of:
the method for determining an oriented 3D representation of the head of a person in a natural visual posture according to the invention; and/or
the method of determining fitting parameter of a pair of spectacle lenses adapted for a person using the oriented 3D representation of the head of the person obtain by a method according to the invention.

The invention also relates to a computer-readable storage medium having a program recorded thereon; where the program makes the computer execute at least one of the methods of the invention.

The invention further relates to a device comprising a processor adapted to store one or more sequence of instructions and to carry out at least one of the steps of the method according to the invention.

Unless specifically stated otherwise, as apparent from the following discussions, it is appreciated that throughout the specification discussions utilizing terms such as "computing", "calculating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method.

The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Embodiments of the invention will now be described, by way of example only, and with reference to the following drawings in which.

Elements in the figures are illustrated for simplicity and clarity and have not necessarily been drawn to scale. For example, the dimensions of some of the elements in the figure may be exaggerated relative to other elements to help improve the understanding of the embodiments of the present invention.

DETAILED DESCRIPTION OF PREFERRED EMBODIMENTS

Figure 1:
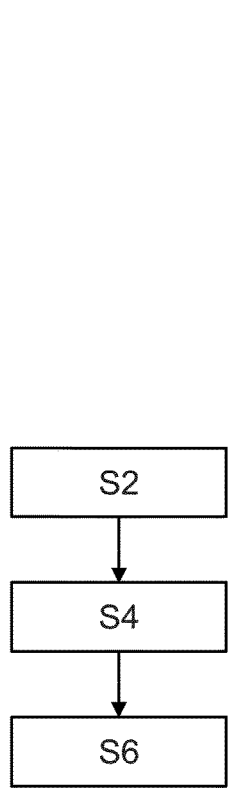
FIG. 1 is an illustration of a chart-flow of a method for determining an oriented 3D representation of the head of a person in a natural visual posture according to the invention.

With reference to FIG. 1, the invention relates to a method for determining an oriented 3D representation of the head of a person in a natural visual posture. In practice, the method is implemented by computer means.

In the sense of the invention, a natural visual posture of a wearer is a wearer's posture in a natural environment, i.e. free of any constraint. For example, the wearer's field of view must be clear, in other words not facing an instrument or mirror.

In the sense of the invention a "frame" refers to a reference frame unless specifically referring to a "spectacle frame".

The method comprises at least:
a) a first dataset receiving step S2,
b) a second dataset determining step S4, and
c) an oriented 3D representation determining step S6.

During the first dataset receiving step S2, a first dataset corresponding to a first 3D representation of the head of the person in a first frame and the position of the rotation center of at least one eye of the person in said first frame are received.

For example, the first dataset is in the form of a cloudpoint or a mesh.

During the acquisition of three-dimensional images, the person is in front of an instrument in an undefined posture and allows to acquire a correct head metric in order to be in a metrologic frame for the determination of the position of the rotation center of at least one eye and for step b).

The first dataset is expressed in an undefined frame which can be either an instrument frame or a head frame.

Then, a second dataset corresponding to the orientation of the head of the person in a natural visual posture in a second frame is determined during the second dataset determining step S4.

The second dataset may further comprise characteristics of reference points on the 3D representation of the head of the person, such as nose bridge point, also referred to as (Nasion point) and/or the nose tip point and/or the external or outer canthus and/or internal or inner canthus.

During this step, an eye care practitioner measures wearer's postures, for example in a different environment than the one used for collecting the first set of data. Such postures are natural visual postures, i.e. free of any constraint. For example, the wearer's field of view must be clear (not in front a mirror) in order to have a more representative posture. In other words, such natural visual postures are postures verified by the eye care practitioner in an environment closer to the wearer's daily life.

To this end, the head position (3D head scan, landmarks on image . . . ) and gaze targets are measured in the same second frame. Different methods described below can be implemented to measure the posture of the person.

For example, the person is preferably placed in a real-life situation in which the posture of the head of the person is unconstrained in the step S4.

Advantageously, during the step b) relating to the determination of the second dataset, the person carries out one or more habitual activities, for example, one of the following activities:
reading from various media (book, magazine, smart phone, laptop, desktop computer)
using a smart phone or a tablet (watching videos, looking at pictures, taking photography)
working at a desk,
driving,
practicing a sport,
cooking,
playing on a games console,
resting seated,
watching the television,
playing a musical instrument.

Preferably, during step b), the direction of the gaze of the person is determined.

According to an embodiment, during the step b) relating to the determination of the second dataset, the person may be wearing a spectacle frame, for example a spectacle frame chosen by the wearer. According to such embodiment, the second set of data may further comprise characteristics of the spectacle frame such as the middle bridge point, and/or boxing data and/or the bottom point of the frame.

During the oriented 3D representation determining step S6, an oriented 3D representation of the head of the person by orienting the first 3D representation of the head of the person is determined based on the orientation of the head of the person of determined during step S4 in a common frame linked to the head.

Preferably, the origin of the common frame is based on said rotation center of said at least one eye of the person.

Preferably, the first dataset comprises the position of the rotation center of both eyes of the person in the first frame and the origin of the common frame corresponds to the cyclopean eye of the person.

Furthermore, each of the first and second dataset are advantageously stored in correspondence with an identifier of the person in a step prior to step S6.

According to another embodiment compatible with the previous one, the position of the rotation center of the eye of the person is further determined from one or more acquisitions of images of the head of the person in step b).

Preferably, to determine the direction of the gaze of the person, the image of the pupil of the person or the corneal reflection is identified in the image captured in step b). The sought direction of the gaze is then deduced therefrom depending on the position of the rotation center in the second frame of reference, said position being determined in the first set of data in the first frame of reference.

Advantageously, to determine the direction of the gaze of the person, the position in the second frame of reference of elements targeted by the gaze and belonging to the environment of the person is determined.

According to another embodiment compatible with the previous ones, in step S4, the second set of data comprises preferably a series of second images of the head of the person being acquired while the person is fixating his gaze on a visual target. The position of this visual target with respect to a second image-capturing device is determined during the capture of each second image.

According to another embodiment compatible with the previous ones, the first dataset is preferably acquired by virtue of a first device for capturing three-dimensional images. This three-dimensional image then constitutes said first representation of the head of the person.

Preferably, the three-dimensional image is done ear to ear in order to fit a frame.

During the acquisition of three-dimensional images, the person is in front of an instrument in an undefined posture and allows to acquire a correct head metric in order to be in a metrologic frame for the determination of the position of the rotation center of at least one eye and for step b).

Such three-dimensional images can be obtained by photogrammetry, pattern/frange projection, stereoscopy . . . .

Figure 2:
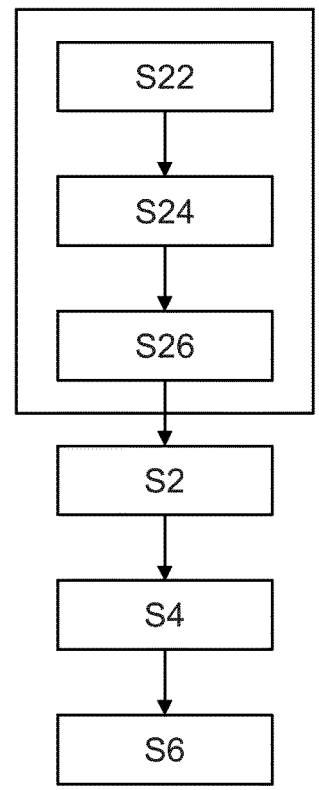
FIG. 2 is an illustration of a chart-flow of a method for determining an oriented 3D representation of the head of a person in a natural visual posture according to another embodiment of the invention.

For example, according to the embodiment illustrated on FIG. 2, upon acquiring the first dataset, the position of the rotation center in the first frame of reference is advantageously determined by the following steps:
- a step S22 wherein at least two images of the head of the person are captured using an image-capturing device, in which images of the postures of the head of the person with respect to said image-capturing device are different and in which images the person is fixating his gaze on a sighting point of predetermined position,
- a step S24 for determining the gaze directions of the person to each of the two images,
- a step S26 wherein the position of the rotation center of at least one eye of the person is deduced therefrom.

Thus, the position of the rotation center in the first frame is determined from a plurality of images of the head of the person captured in different head poses while keeping the same gaze direction, i.e. having various head tilt, roll, cap but with gaze always on a same target (for example, the central camera lens).

Of course, the position of the rotation center in the first frame can be alternatively determined from a plurality of images of the head of the person captured in fixed head while the target is moving.

Preferably, the step S4 and the step of acquiring the first dataset are carried out separately and using different image-capturing devices.

According to another embodiment compatible with the previous ones, the method further comprises prior to step b) a step of calibrating, during which a calibration of a second device for capturing two-dimensional or three-dimensional images is carried out. An image of a dedicated standard object is captured with said second image-capturing device during this step of calibrating.

Advantageously, the position and/or orientation in space of said second image-capturing device is determined during step b). Furthermore, information relating to the position and/or orientation of the head of the person in space in a natural visual posture is determined therefrom.

According to another embodiment compatible with the previous ones, the same, or at least the same type of, image-capturing device may be used when determining the first and second set of data.

For example, the image-capturing device is positioned on a table at the eye care practitioner end with a large clear field of view for the person when looking ahead in a natural posture. The image-capturing device is tilted to see the face of the person. The height of image capturing device is lower than head position of the person.

During step a), the person lowers the head, looks at the image-capturing device and moves his head during at least 2 shots or a time sequence.

Advantageously, the head lowering allows a better precision for the measurements because the angle of the head and the view angle of the camera are close.

This step allows measuring and determining the precise measurements of the 3D of the face, the eye rotation center position in the head and eventually measurements of the spectacle frame the person may be wearing, such as the position of the spectacle frame on the head and/or the shape of the spectacle frame.

In a second phase, the person is placed in a situation free of any posture constraint. The eye care practitioner makes the posture measurement in the optimal posture for lenses fitting measurements. This posture measurement can be done with the same image-capturing device in a natural head posture. Such measurements can be done a long time after the measurements of step a) and in another place. The head posture measurement is a simple and quick measurement.

Another object of the invention relates to a method of determining fitting parameter of a pair of spectacle lenses adapted for a person using the oriented 3D representation of the head of the person obtain by a method according to the invention and as previously described.

The fitting parameters may be determined with all the data collected.

For example, the fitting parameters may comprise the eyes centers of rotation distances, which is the Euclidian distance between the 3D position of eye rotation center of the right eye and eye rotation center of the left eye.

The fitting parameters may further or alternatively comprise the semi-pupillary distance that may be determined with the nose tip point or with the nose bridge point. An orthogonal projection of the nose tip point or nose bridge point is calculated in accordance to the head orientation. The intersection between the line joining the two eye rotation centers and the projection of the nose tip point or nose bridge point gives the section to determine the semi-pupillary distance. Semi-pupillary distances are the Euclidean distance between this point and each eye rotation center.

Such fitting parameters can then be used to manufacture and provide a pair of spectacle lenses adapted for the person.

Different methods to measure the posture of the person will now be described.

Example 1

According to a first method, an eye care practitioner (ECP) manages the "natural" posture measurement in order to determine the orientation of the center of rotation of at least one eye of the person. The eye care practitioner decides himself when the wearer is in the good posture thanks to his professional expertise.

For example, for a static situation, the person can look straight ahead at distance objects and the ECP is in front of the person and he fixes one after the other the ECP right and left eye. For a dynamic situation, the person can walk or be in social interaction.

A dedicated device away from the person's field of vision measures the head posture in relation with the 3D representation of the head done before and determines the ERC orientation of the center of rotation of at least one eye (ERC) in world environment.

The recording of the posture can be done in one shot or during a time sequence. The measurement can be done online or offline: the eye care practitioner chooses the best part or moments of the posture measurement to determine the orientation of the ERC.

Example 2

According to a second method, an eye care practitioner (ECP) marks with a cross or with lines on the lenses where the fitting gives a good posture, for example from an old comfortable vision pair of eyeglasses or from a new pair of eyeglasses with a new manual fitting done by the ECP.

Then, the natural posture is measured from the lenses fitting.

For example, the person can be in front of a mirror containing a device for capturing three-dimensional images, for example a 3D scanner, wearing the eyeglasses. The person aligns his eyes with the marks on the lenses and the 3D scanner measures again the head with the eyeglasses in order to calculate from the initial 3D scan of the wearer's head the natural head posture.

The head angles giving the right posture are now recorded for the person and can be used for fitting other eyeglasses.

Further fitting measurement can be done in front of a 3D scanner or other device controlling the head posture and asking the person to put his head in the right posture to make fitting measurement.

A new pair of eyeglasses digitized remotely fitted on the wearers' head, thanks to the 3D scan containing the cyclopes ERCs of the wearers' head, could have it's lenses fitting measurements calculated based on the good fitting posture previously recorded.

Example 3

Figure 3:
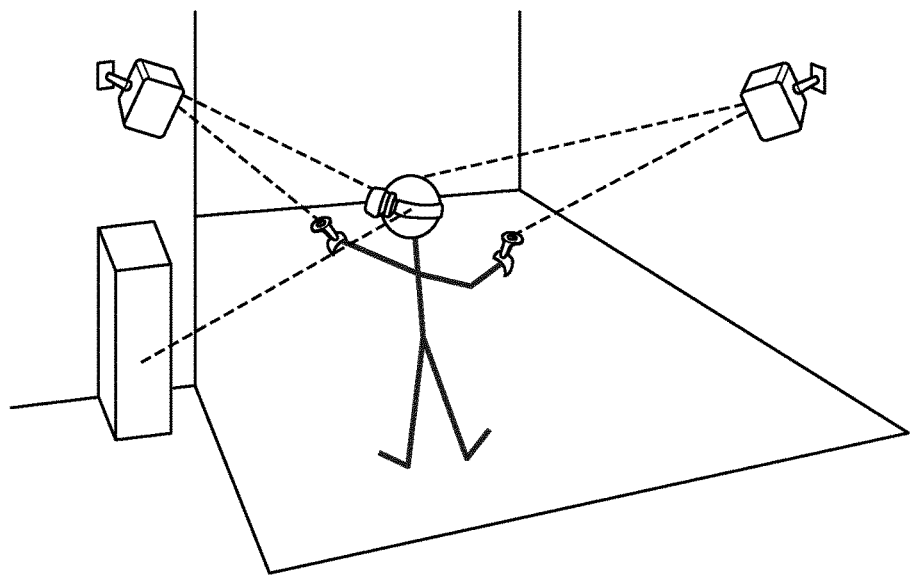
FIG. 3 is an illustration of a method for measuring the posture of a person.

According to a third method illustrated on FIG. 3, the person is wearing a virtual reality headset. The position and/or orientation of the virtual reality headset onto the wearers' head can be determined, thanks to the 3D representation of the head of the person, into the room (real world).

The person is immersed into virtual reality environment and performs one or several activity that can be personalized based on wearers' lifestyle.

The head posture is measured by the positioning of the helmet in the real world thanks to the headset tracking system and applying the headset/head.

The eye care practitioner can choose the fitting posture based on the results of the previous steps.

The head angles giving the right posture are now recorded for the person and can be used for fitting other eyeglasses as previously described.

Example 4

According to a fourth method, the person is wearing a head posture measurement device, such as a headband with Inertial Motion Unit (IMU) sensor or sensor directly fixed on the head. The orientation onto the wearers' head can be determined.

An eye care practitioner measures the lenses fitting posture(s) in one or different tasks/activities.

The IMU sensor data can be saved when the eye care practitioner wants.

Several tasks/activities can be measured, e.g. reading, looking straight in far vision, primary position, using smartphone, using the computer, office desk configuration . . . .

The eye care practitioner can choose the fitting posture based on the results of the previous steps.

The head angles giving the right posture are now recorded for the person and can be used for fitting other eyeglasses.

The invention as disclosed hereinbefore allows a determination of an oriented 3D representation of the head of a person taking into account the posture of the body and of the head of the person in a natural visual posture.

The invention has been described above with the aid of embodiments without limitation of the general inventive concept.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method implemented by computer for determining an oriented 3D representation of a head of a person, the method comprising:
   a) receiving a first dataset corresponding to a first 3D representation of the head of the person in a first reference frame and a position of a rotation center of at least one eye of the person in said first reference frame;
   b) determining a second dataset corresponding to the orientation of the head of the person in a second reference frame; and
   c) determining an oriented 3D representation of the head of the person by orienting the first 3D representation of the head of the person based on the orientation of the head of the person of step b) in a common reference frame,
   wherein the second dataset comprises characteristics of a spectacle frame including the middle bridge point, and/or boxing data and/or a bottom point of the spectacle frame, and
   wherein the position of the rotation center of at least one eye of the person in the first reference frame, received in the receiving, is determined from a plurality of images of the head of the person captured in different head poses while the person fixates a same target and/or captured in fixed head while the target is moving.

2. The method according to claim 1, wherein during step b), a direction of a gaze of the person is determined.

3. The method according to claim 1, wherein an origin of the common reference frame is based on said rotation center of said at least one eye of the person.

4. The method according to claim 1, wherein, in step b), the person is placed in a situation in which a posture of the head of the person is unconstrained.

5. The method according to claim 1, wherein, in the step b), the person carries out one or more activities including reading from various media including book, magazine, smart phone, laptop, and desktop computer, using a smart phone or a tablet including watching videos, looking at pictures, and taking photography, working at a desk, driving, practicing a sport, cooking, playing on a game console, resting, seated, watching television, and playing a musical instrument.

6. The method according to claim 1, wherein, in step b), the position of the rotation center of the eye of the person is determined from one or more acquisitions of images of the head of the person.

7. The method according to claim 1, wherein to determine a direction of a gaze of the person, an image of a pupil of the person or a corneal reflection is identified in the image captured in step b), and a sought direction of the gaze is deduced therefrom depending on the position of the rotation center in the second reference frame, said position being determined in a first set of data in the first reference frame.

8. The method according to claim 7, wherein, to determine the direction of the gaze of the person, the position in the second reference frame of elements targeted by the gaze and belonging to an environment of the person is determined.

9. The method according to claim 1, wherein in step b), a second set of data comprises a series of second images of the head of the person being acquired while the person is fixating his gaze on a visual target, a position of this visual target with respect to a second image-capturing device is determined during capture of each second image.

10. The method according to claim 1, wherein the first dataset comprises the position of a rotation center of both eyes of the person in the first reference frame and an origin of the common reference frame corresponds to a cyclopean eye of the person.

11. The method according to claim 1, wherein the first dataset is acquired by virtue of a first device for capturing three-dimensional images, this three-dimensional image then constituting said first representation of the head of the person.

12. The method according to claim 11, wherein, upon acquiring the first dataset the position of the rotation center in the first reference frame is determined by:

at least two images of the head of the person are captured using an image-capturing device, in which images of postures of the head of the person with respect to said image-capturing device are different and in which images the person is fixating his gaze on a sighting point of predetermined position, gaze directions of the person corresponding to each of the two images are determined, and the position of the rotation center of at least one eye of the person is deduced therefrom.

13. A method of determining fitting parameter of a pair of spectacle lenses adapted for a person using the oriented 3D representation of the head of the person obtained by the method of claim 1.

14. A non-transitory computer readable medium having stored thereon a program that when executed by a computer causes the computer to implement a method implemented by computer for determining an oriented 3D representation of a head of a person, the method comprising:

a) receiving a first dataset corresponding to a first 3D representation of the head of the person in a first reference frame and a position of a rotation center of at least one eye of the person in said first reference frame;

b) determining a second dataset corresponding to the orientation of the head of the person in a second reference frame; and c) determining an oriented 3D representation of the head of the person by orienting the first 3D representation of the head of the person based on the orientation of the head of the person of step b) in a common reference frame, wherein the second dataset comprises characteristics of a spectacle frame including the middle bridge point, and/or boxing data and/or a bottom point of the spectacle frame, and wherein the position of the rotation center of at least one eye of the person in the first reference frame, received in the receiving, is determined from a plurality of images of the head of the person captured in different head poses while the person fixates a same target and/or captured in fixed head while the target is moving.

* * * * *